United States Patent [19]

Belforte et al.

[11] 4,096,396

[45] Jun. 20, 1978

[54] CHRONOMETRIC SYSTEM WITH SEVERAL SYNCHRONIZED TIME-BASE UNITS

[75] Inventors: Piero Belforte; Flavio Melindo, both of Turin, Italy

[73] Assignee: CSELT - Centro Studi e Laboratori Telecomunicazioni, Turin, Italy

[21] Appl. No.: 748,774

[22] Filed: Dec. 8, 1976

[30] Foreign Application Priority Data

Dec. 9, 1975 Italy ............................... 70005 A/75

[51] Int. Cl.² .................................................. H03K 1/02
[52] U.S. Cl. .................................... 307/219; 307/269; 328/63
[58] Field of Search ................... 307/219, 269; 328/63

[56] References Cited

U.S. PATENT DOCUMENTS

| | | | |
|---|---|---|---|
| 3,044,065 | 7/1962 | Barney et al. | 328/63 X |
| 3,329,905 | 7/1967 | Niertit et al. | 307/219 X |
| 3,350,580 | 10/1967 | Harrison | 307/219 X |
| 3,522,455 | 8/1970 | Thomas et al. | 307/219 X |
| 3,564,448 | 2/1971 | Watkins | 307/219 X |
| 3,751,685 | 8/1973 | Jaeger | 307/269 X |
| 3,956,704 | 5/1976 | Keeney et al. | 307/219 X |

*Primary Examiner*—John S. Heyman
*Attorney, Agent, or Firm*—Karl F. Ross

[57] ABSTRACT

Three identical time-base units include respective binary counting circuits which are stepped in parallel by a series of clock pulses to generate trains of timing pulses and, after a certain number of clock cycles following resetting by a zeroizing pulse, emit synchronizing pulses which are jointly fed to three decision networks respectively associated with these counting circuits. The decision networks determine by majority logic whether synchronizing signals from at least two of the three counting circuits coincide and upon such coincidence cause the resetting of the respective counting circuits to zero. A monitoring circuit, also operating by majority logic, is connected to the three decision networks to indicate a malfunction of any of the three time-base units without halting the generation of the timing pulses by the defective unit if the latter is merely out of step. The clock pulses are obtained by each counting circuit from a square-wave oscillator through a switchover circuit which, upon detecting failure of that oscillator, replaces it within a fraction of a clock cycle by a standby oscillator whose own operating condition is also continuously checked. Each counting circuit includes a primary counter and a secondary counter stepped in parallel but with a relative offset to allow for differences in transit time of the synchronizing signals sent to the three decision networks.

16 Claims, 11 Drawing Figures

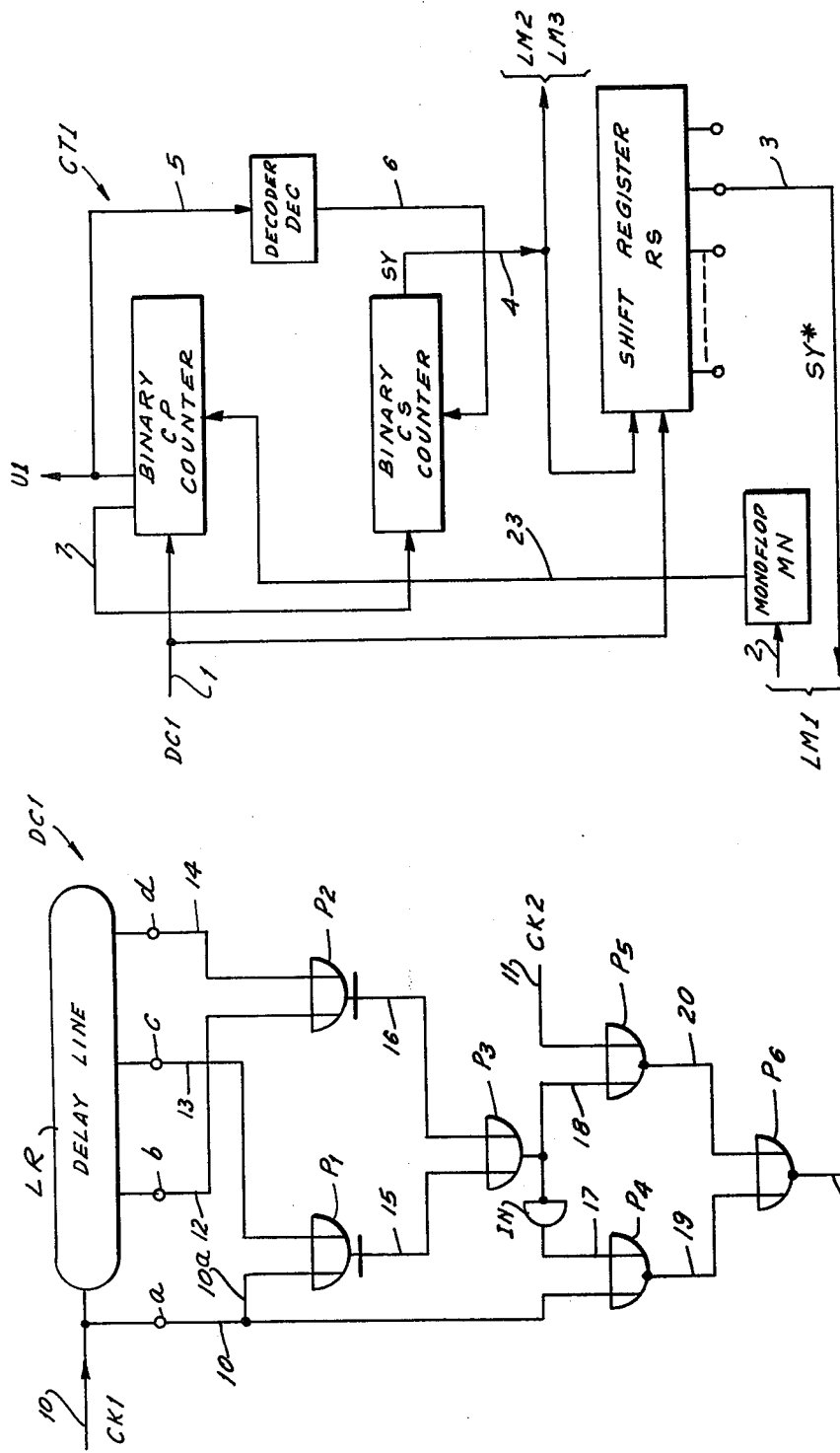

FIG. 8
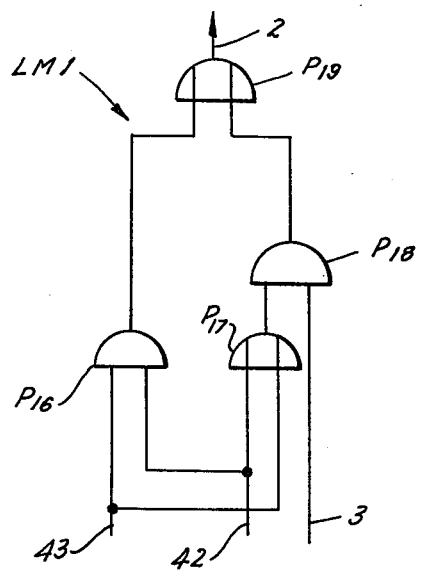
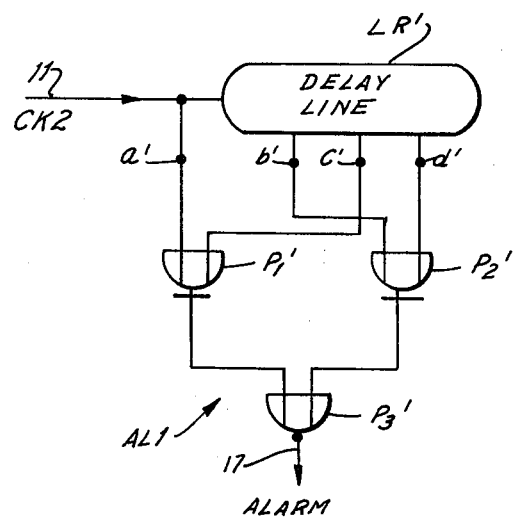
FIG. 9

CHRONOMETRIC SYSTEM WITH SEVERAL SYNCHRONIZED TIME-BASE UNITS

FIELD OF THE INVENTION

Our present invention relates to a chronometric system designed to generate separate but synchronized trains of timing signals as used, for example, in telecommunication networks in which processing equipment at a central office is duplicated to avoid a disruption of service in the event of a breakdown.

BACKGROUND OF THE INVENTION

In order to replace a defective active component by an identical standby component without an objectionable discontinuity in signal transmission, it is essential that the two components by precisely synchronized by receiving recurrent timing signals strictly in step with each other. These timing signals are usually derived from a master clock by frequency division in a step-down circuit such as a pulse counter forming part of a time-base unit. The use of a single time-base unit for the operating and standby components entails the risk that failure of this unit may disable both components controlled by it. This risk is, of course, aggravated when there are more than two components to which timing pulses must be supplied in synchronism, such as a principal component, a standby component and a reserve component adapted to be substituted for one another.

It is, therefore, convenient to duplicate not only the operating component but also the associated time-base unit. However, if one of two such units falls out of step with the other, it may be difficult or impossible to ascertain instantaneously which of these units is keeping correct time. Thus, even with only two controlled components there should be at least three time-base units which are normally synchronized with one another so that loss of synchronism is a single unit will readily reveal itself.

Conventional chronometric systems of this description suffer from a variety of drawbacks, including complex and correspondingly expensive circuitry, limited reliability, lenghty start-up or recovery periods, need for very precise and thus costly signal generators, and lack of exact synchronism between the trains of output pulses generated by the serveral time-base units.

Another problem arising in such a system is the need for an instantaneous switchover from a master oscillator, generating the original clock pulses for all time-base units, and a standby oscillator in the event of failure of the former.

OBJECTS OF THE INVENTION

It is, therefore, an object of our present invention to provide an improved chronometric system for the purpose set forth which obviates the various drawbacks enumerated above.

It is also an object of this invention to provide means in such a system enabling a quick switchover, within a fraction of a clock cycle, from a master oscillator to a standby oscillator and for verifying that the latter is in proper working condition.

Another object of our invention is to provide a chronometric system of this character which can operate efficiently, at least on a temporary basis or under less exacting conditions, with a reduced number of time-base units.

SUMMARY OF THE INVENTION

In its broader aspects, our invention contemplates the use of a chronometric system with at least two substantially identical time-base units, each of these units including a timing network and an associated decision network. The timing network has a stepping input connected to a source of clock pulses common to all these units, a resetting input connected to the associated decision network, a main output for the emission of timing signals at a rate harmonically related to the cadence of the clock pulses, and two or more ancillary outputs for the concurrent transmission of synchronizing signals to the decision networks of all time-base units (including its own) a predetermined number of clock-pulse cycles after reception of a coincidence signal on its resetting input. This coincidence signal is generated by logical circuitry in the associated decision network in response to concurrent synchronizing signals received from at least a majority of the time-base units, i.e. from both units if only two such units are active in the system.

According to another feature of our invention, the clock-pulse source includes a master oscillator and a standby oscillator of identical operating frequencies in combination with switchover means for replacing an output lead of the master oscillator, normally connected to the serveral timing networks, with a normally disconnected output lead of the standby oscillator in response to absence of clock pulses from the first-mentioned lead. The switchover means advantageously include a delay line tied to the output lead of the master oscillator and provided with a plurality of terminals which carry the incoming clock pulses with phase differences corresponding to integral fractions of a clock-pulse cycle; a set of logic gates, preferably of the Exclusive—OR (XOR) type, have input connections to certain of these terminals for energization during overlapping periods of a clock cycle.

Pursuant to a further feature of our invention, the timing network of each time-base unit includes two pulse counters stepped by incoming clock pulses, i.e. a primary counter resettable by the aforementioned coincidence signal and a secondary counter resettable by a delayed signal from the primary counter. The stepping of the secondary counter may occur at a reduced rate, via one or more frequency-dividing stages of the primary counter. The synchronizing signal emitted by the time-base unit is generated by the secondary pulse counter which feeds that signal to the decision network of any time-base unit other than its own before the synchronizing signal reaches the associated decision network in its own unit, the resulting time interval compensating for differences in transit time to the several decision networks so as to insure a precise concurrence of the synchronizing signals from all units in each decision network during normal operation.

Still another feature of our invention resides in the provision of monitoring means connected to all decision networks for generating an error signal whenever there is a concurrence of synchronizing signals from less than all time-base units, with actuation of an alarm indicator to reveal this state of affairs to an operator and/or to initiate automatic corrective measures. If the number $n$ of time-base units is greater than 2, the alarm-indicating means preferably include $n$ signal-generating networks with $n$ inputs each and a set of logic gates connecting the $n$ inputs of each signal-generating network to the outputs and to respective inputs of all decision networks in such a way that each signal-generating network receives an error signal only upon a malfunction of a specific time-base unit, with generation of an alarm signal by any of these networks only in response to a concurrence of error signals on at least a majority of its $n$ inputs. In the system particularly described hereinafter, $n = 3$.

BRIEF DESCRIPTION OF THE DRAWING

The above and other features of our invention will now be described in detail with reference to the accompanying drawing in which:

FIG. 2 is a circuit diagram of a switchover network forming part of one of the time-base units of FIG. 1;

FIG. 4 is a more detailed block diagram of a timing network included in one of the time-base units of FIG. 1;

FIG. 8 shows details of a majority-type logic circuit also forming part of one of the time-base units of FIG.1; and FIG. 9 shows details of an alarm circuit likewise included in one of these units.

SPECIFIC DESCRIPTION

Figure 1:
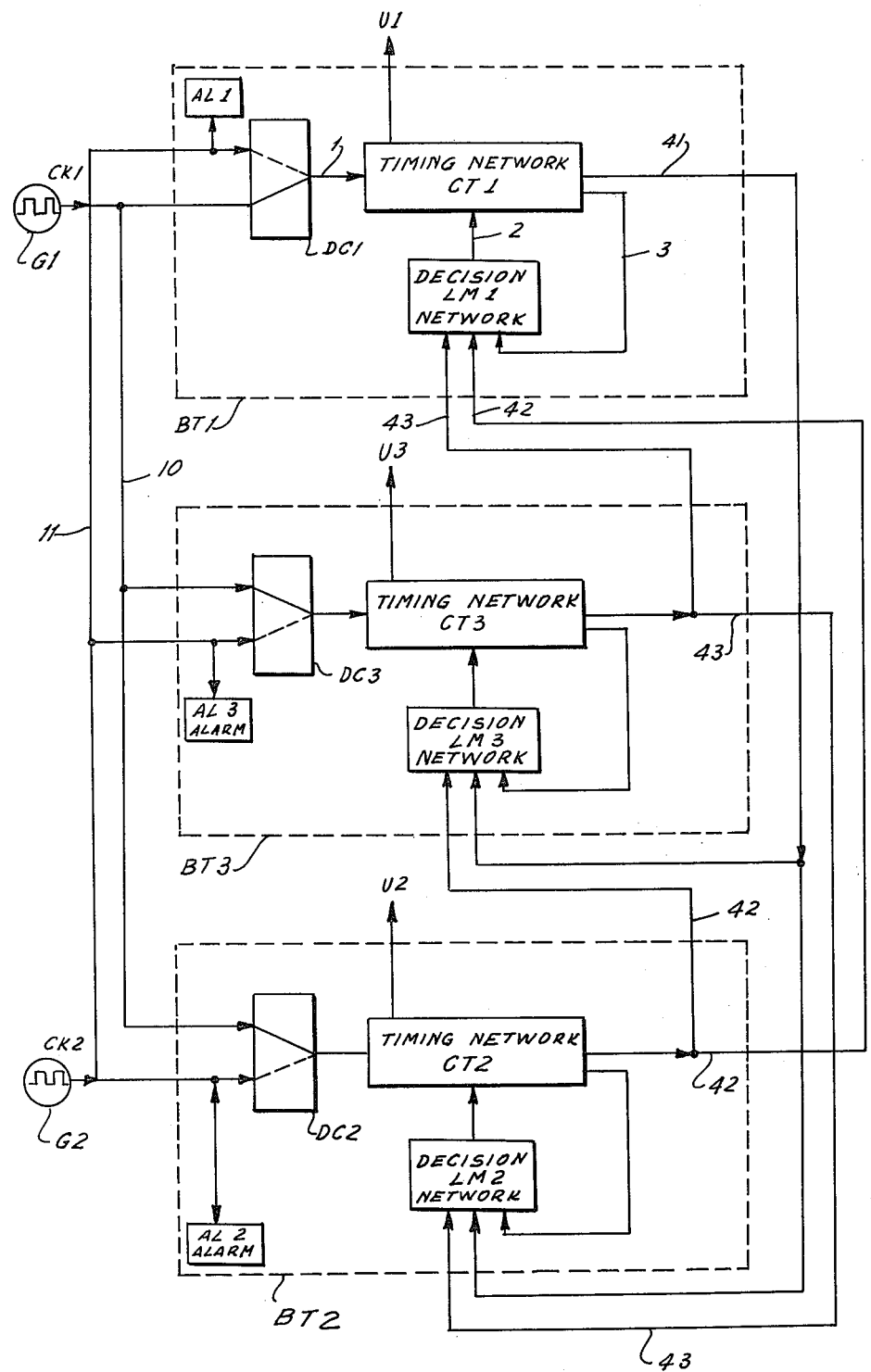
FIG. 1 is a block diagram of a chronometric system with three time-base units embodying our invention.

In FIG. 1 we have shown three identical time-base units BT1, BT2 and BT3 of which at least two, e.g. units BT1 and BT2, control nonillustrated active and standby equipment of a telephone exchange or the like. Each unit comprises a timing network CT1, CT2, CT3 having a stepping unit 1 connected to a switchover network DC1, DC2, DC3, a resetting input 2 connected to an output of an associated decision network LM1, LM2, LM3, a main output U1, U2, U3 emitting timing signals which are normally synchronized for all three units, and ancillary outputs in the form of internal leads 3 carrying a synchronizing signal to their own decision units LM1, LM2, LM3 and outgoing leads 41, 42, 43 each carrying such signals to the two other decision networks. A source of clock pulses comprises a master square-wave oscillator G1 and a substantially identical standby oscillator G2. Oscillator G1 has an output lead 10 delivering clock pulses CK1 in parallel to a first input of each switchover network DC1 – DC3, a second input of each of these networks being connected to an output lead 11 of generator G2 carrying clock pulses CK2. Though the lead 11 is normally disconnected from timing networks CT1 – CT3, pulses CK2 are continuously generated by oscillator G2 whose performance is checked by respective alarm circuits AL1, AL2, AL3 in units BT1 – BT3; while a single alarm circuit would suffice for ascertaining the proper operation of oscillator G2, the provision of three such circuits individual to the respective time-base units serve to determined whether the several branches of its output lead 11 are also intact.

In FIG. 2 we have shown details of switchcover network DC1 which is representative of all three networks DC1 – DC3. This network comprises a delay line LR with four output terminals a, b, c and d, line LR receiving the clock pulses CK1 from lead 10 which is also tied to terminal a. Terminals b, c, and d are taps on line LR separated from one another, and from supply lead 10, by line sections introducing identical delays of T/4 where T is the length of a clock cycle. Terminals a and c are tied to respective inputs 10a and 13 of a XOR gate $P_1$, another XOR gate $P_2$ having inputs 12 and 14 tied to terminals b and d. Outputs 15 and 16 of gates $P_1$ and $P_2$ work into an OR gate $P_3$ with an output lead 17 including an inverter IN and with a noninverting output lead 18. A NOR gate $P_4$ has inputs tied to leads 10 and 17 while another NOR gate $P_5$ has inputs tied to leads 11 and 18, these two NOR gates working into inputs 19 and 20 of a further NOR gate $P_6$ whose output is the lead 1 extending to timing network CT1 in FIG. 1.

Figure 3A:
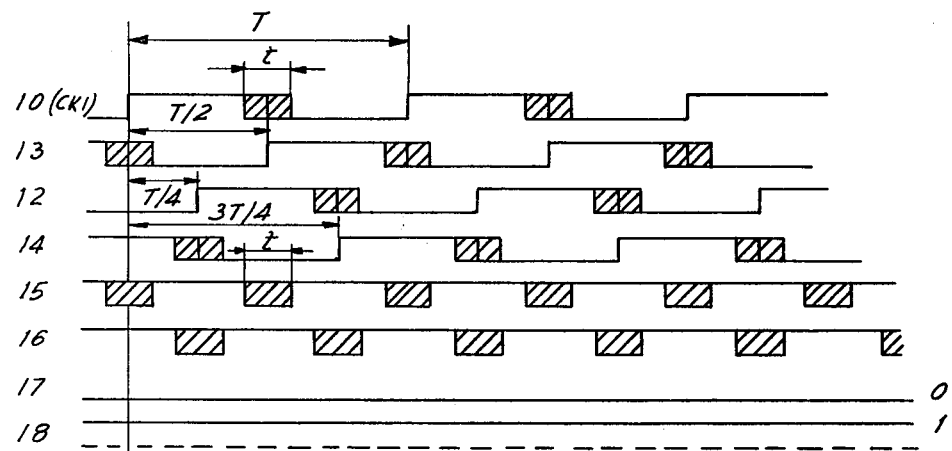
FIGS. 3a, 3b and 3c are graphs showing the generation of timing pulses under normal and different off-normal conditions.

The operation of the switchover network DC1 will now be described with reference to FIGS. 3a, 3b and 3c. It will be assumed that clock-pulse generators G1 and G2 have only a moderate degree of stability in the sense that the length of a clock pulse, nominally emitted with a 50% duty ratio, may vary between somewhat less and somewhat more than half a clock cycle T. Thus, we have shown in FIG. 3a a hatched area of duration $t < \lambda < T$ within which their trailing edge may fall. The first four graphs of FIG. 3a, labeled 10, 13, 12 and 14, depict the occurrence of clock pulses CK1 on the correspondingly designated conductors of FIG. 2 and therefore on terminals a, c, b and d, respectively. Output leads 15 and 16 of gates $P_1$ and $P_2$ are energized with interruptions not exceeding the time $t$, as indicated by the correspondingly labeled graphs of FIG. 3a. Because of the limited length $t$, equaling less than a quarter-cycle T/4, the interruptions on leads 15 and 16 never overlap so that the inverting and noninverting output leads 17 and 18 of NOR gate $P_3$ are always at logical "0" and logical "1", respectively, as shown in the two bottom graphs of FIG. 3a. The de-energizaion of lead 17 unblocks the NOR gate $P_4$ for the passage of an inverted replica of clock pulses CK1 to NOR gate $P_6$ where they are reinverted to reach the timing network CT1 (FIG. 4) via lead 1; NOR gate $P_5$ is blocked by the continuous energization of lead 18 with resulting de-energization of lead 20.

Figure 3B:
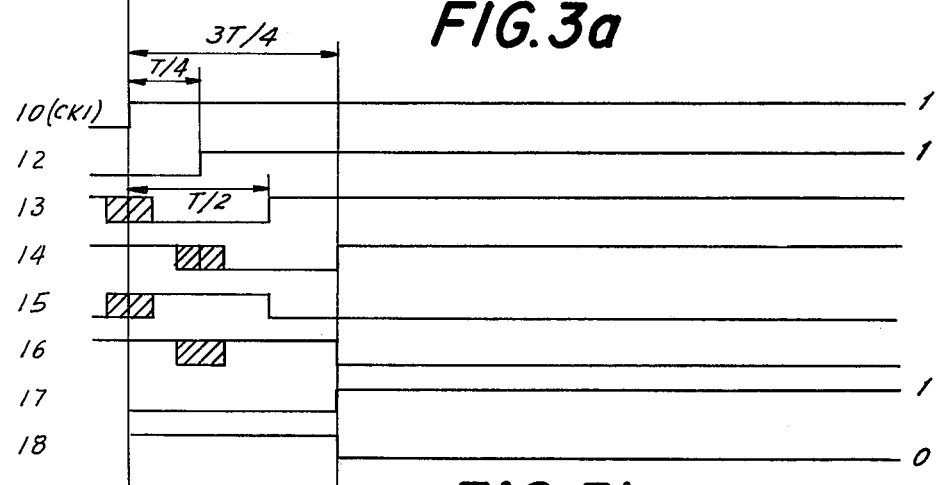

Let us now consider, with reference to FIG. 3b, a malfunction of generator G1 in a condition in which its input lead 10 carries a logical "1", i.e. remains continuously energized. In the first quarter of a cycle the mode of energization of leads 12 – 18 is the same as in the normal case represented by FIG. 3a.

At half-time T/2, the expected de-energization of lead 10 does not occur whereas lead 13 remains at high potential from that point on so that XOR gate $P_1$ is cut off and permanently de-energizes its output lead 15. The same occurs, a quarter-cycle later, with reference to XOR gate $P_2$ and its output lead 16 so that the normal state of energization of leads 17 and 18 is reversed at this time, with lead 17 carrying a logical "1" to block the gate $P_4$ whereas lead 18 carries a logical "0" to unblock the gate $P_5$ and give passage to clock pulses CK2 from lead 11 in lieu of pulses CK1 from lead 10. This switchover between the two trains of clock pulses thus occurs within a time T/4, less than a clock cycle T.

Figure 3C:
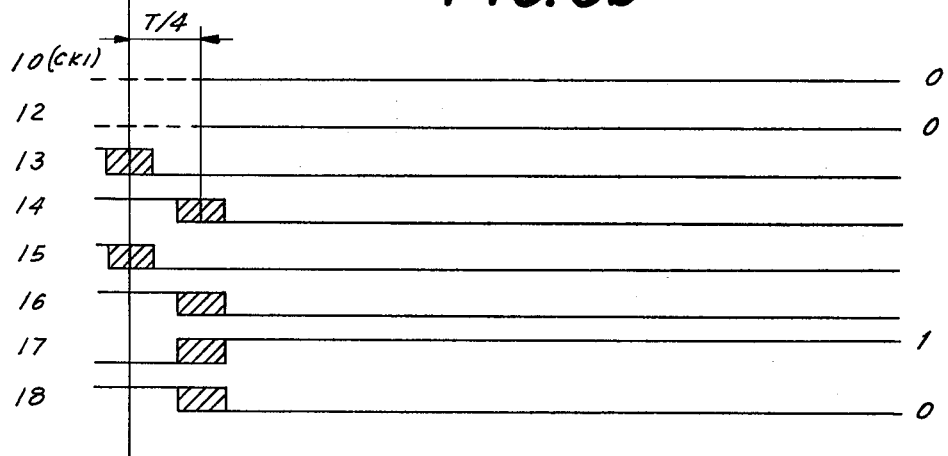

FIG. 3c shows the opposite case in which the pulse train CK1 is interrupted with de-energization of lead 10, possibly as a result of a break in the branch of that lead feeding the network DC1. Here the reversal of the potentials of leads 17 and 18 takes place already after a time T/4 as lead 12 fails to carry the expected logical signal "1", with resulting conduction of XOR gate $P_2$ upon the de-energization of lead 14. Thus, the switchover from oscillator G1 to oscillator G2 takes place in that instance within a quarter of a clock cycle.

If oscillation generation G1 were exceptionally stable, with no area of uncertainty ($t = 0$), gate $P_3$ could be eliminated with cnnection of lead 15 to lead 17 by way of inverter IN and with direct connection of lead 16 to lead 18.

Upon the return of pulse train CK1 on lead 10, network DC1 automatically restores the normal operating condition with de-energization of lead 17 and re-energization of lead 18.

Alarm circuits AL1 – AL3, which check the performance of standby oscillator G2, are similar to the upper part of switchover circuit DC1 as shown in FIG. 9 for the circuit AL1 representing all three of them. Thus, lead 11 carrying clock pulses CK2 feeds a delay line LR' with taps $b'$, $c'$ and $d'$ carrying pulse trains dephased by one quarter, one half and three quarters of a clock cycle with reference to the pulse train appearing on a terminal $a'$ tied to lead 11. XOR gates $P_1'$ and $P_2'$, respectively connected across terminals $a'$, $c'$ and $b'$, $d'$, work into a NOR gate $P_3'$ whose normally de-energized output lead 17' emits an alarm signal if the two XOR gates $P_1'$ and $P_2'$ fail to conduct during overlapping periods (as shown in graphs 15 and 16 of FIG. 3a for the corresponding gates of network DC1).

Figure 5:
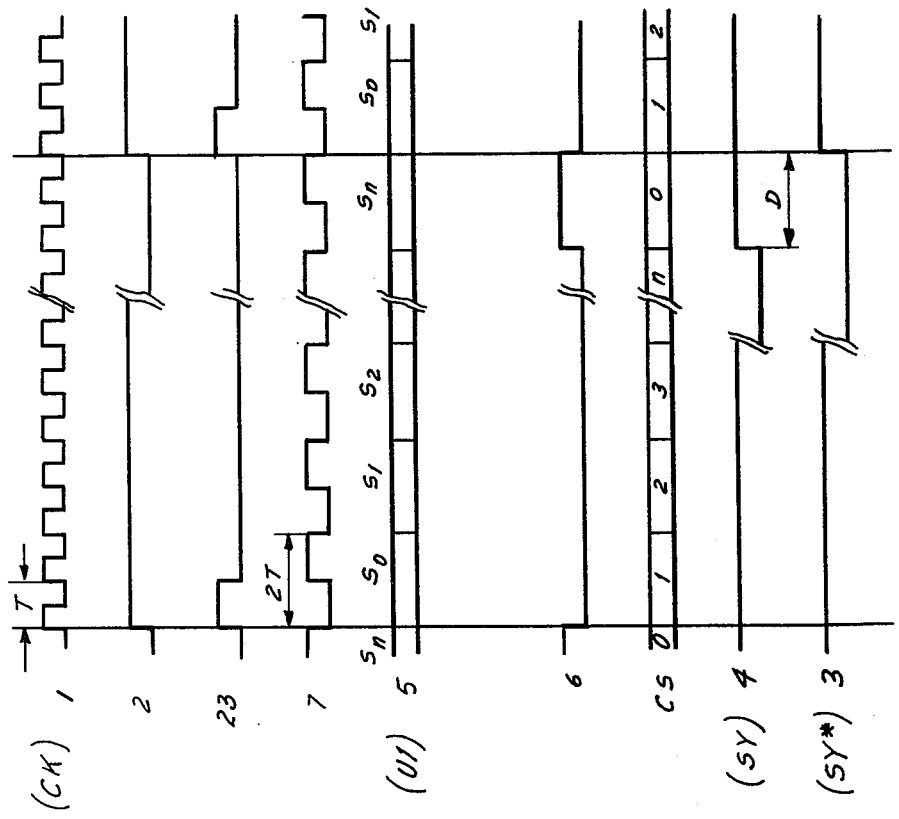
FIG. 5 is a set of graphs relating to the operation of the timing network of FIG. 4.

We shall now describe, with reference to FIGS. 4 and 5, the organization and mode of operation of timing network CT1 representative of the three networks CT1 – CT3 shown in FIG. 1. Network CT1 comprises two binary pulse counters CP and CS, the former being periodically stepped by clock pulses CK (generated by either of the two oscillators G1, G2) appearing on lead 1 as indicated in the first graph of FIG. 5. The first stage output 7 of primary counter CP carries pulses of half the clock-pulse cadence, i.e. with a cycle length 2T, as shown in the correspondingly labeled graph of FIG. 5. These pulses serve to step the secondary counter CS which has a zero-setting input 6 connected via a decoder DEC to an output multiple 5 of primary counter CP delivering the timing signals U1 to an external load. Output multiple 5 is connected to a combination of stages of pulse counter CP so that timing signals $S_0$, $S_1$, $S_2$, ... $S_n$ are periodically generated as shown on graph 5 of FIG. 5. These timing signals, occurring at the cadence of the stepping pulses on lead 7, are different pulse combinations appearing on different conductors of multiple 5, one of these combinations (here the signal $S_n$) triggering the decoder DEC into energizing its output lead 6 with a zeroizing pulse for counter CS. The latter counter has an output lead 4 which, on the $n^{th}$ cycle following its resetting to zero, emits a synchronizing signal SY on outgoing lead 41 which is a branch of internal lead 4. Since only the leading edge of the synchronizing signal SY is of interest, that pulse may last for a considerable part of an $n$-pulse counting cycle.

As will be apparent from graph 4 of FIG. 5, synchronizing signal SY comes into existence prior to the end of a counting cycle of primary pulse counter CP as represented by the termination of the $n^{th}$ timing signal $S_n$ on output 5. The intervening interval D corresponds to the transit time required for signal SY to reach the decision networks LM2 and LM3 via lead 41 (FIG. 1). Interval D extends over a whole number of clock cycles T, here specifically two clock cycles equaling the duration of a stepping—pulse cycle on lead 7.

Lead 4 extends to an input of a shift register RS stepped by the clock pulses on lead 1. After two clock cycles T, a delayed synchronizing signal SY* appears on an output lead 3 of shift register RS which therefore acts as a retarding device compensating the precedence interval D. Output lead 3 extends to the associated decision network LM1 where the delayed signal SY* is to arrive, in normal operation, concurrently with corresponding signals SY received from units BT2 and BT3 via leads 42 and 43, respectively. It will be apparent that signal SY* could also be obtained from decoder DEC upon detection of, say, timing signal $S_O$ in the output of counter CP.

Decision network LM1, as illustrated in FIG. 8, comprises an AND gate P16 and an OR gate P17 connected in parallel to incoming leads 42 and 43. OR gate P17 works into an input of an AND gate P18 whose other input is tied to the other synchronizing lead 3. The two AND gates P16 and P18 feed an OR gate P19 whose output is the lead 2. The two other decision networks LM2 and LM3 are analogously constructed.

Thus, output lead 2 of network LM1 is energized whenever synchronizing signals are simultaneously present on at least two of its three input leads 3, 42 and 43. The resulting coincidence signal, appearing on lead 2 as shown on the corresponding graph of FIG. 5, trips a monoflop MN which generates a zeroizing signal for counter CP on a resetting lead 23 thereof. This zeroizing signal, here shown to last for about a time T, restarts the counting cycle with re-emission of timing signal $S_0$ on output 5, thus giving rise to another synchronizing signal SY in the output of counter CS after a further series of $(n-1)$ stepping pulses on lead 7. This resetting of the principal counter CP takes place simultaneously in all three timing networks CT1 – CT3.

Even if one of the three synchronizing signals fails to appear concurrently with the two others, the coincidence of these two latter signals in the inputs of decision networks LM1 – LM3 causes all three timing networks CT1 – CT3 to operate in step with one another. It is, nevertheless, desirable to detect as soon as possible a malfunction of any of these timing networks which either prevents or excessively delays the generation of such a synchronizing signal on the internal output lead 3 and/or on the outgoing output lead 41, 42 or 43 of any one of these networks.

Figure 6:
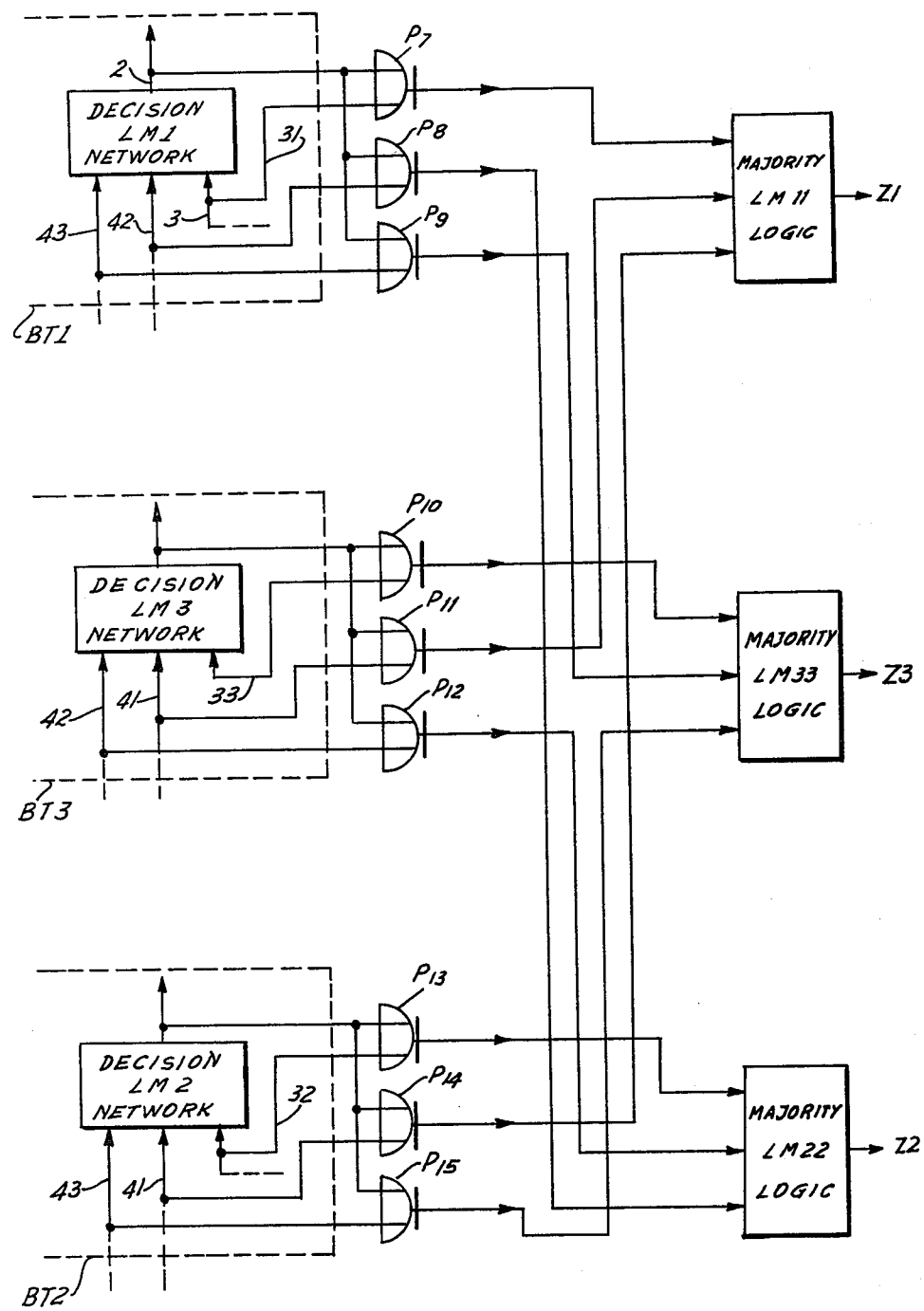
FIG. 6 shows a monitoring circuit coacting with three decision networks included in the time-base units of FIG. 1.

For this purpose a monitoring circuit, omitted in FIG. 1 but shown in FIG. 6, is connected to the inputs and outputs of all three decision networks, this monitoring circuit comprising nine XOR gates $P_7$ – $P_{15}$. Gates $P_7$, $P_8$ and $P_9$, associated with time-base units BT1, each have one input connected to output lead 2 of decision network LM1 and have their other inputs respectively tied to a branch 31 of internal lead 3 and to incoming leads 42, 43 from the other two decision networks. In an analogous manner, gates P10, P11 and P12 associated with unit BT3 have inputs tied to leads 33, 41 and 42 whereas gates P13, P14 and P15 associated with unit BT2 have inputs tied to leads 32, 41 and 43.

Each XOR gate, accordingly, conducts only if the output voltage of the associated decision network does not correspond to the voltage of one of its input leads, i.e. if a concurrence of synchronizing signals occurs on but two input leads of that network. Thus, conduction of gate P7, P11 or P14 signifies a malfunction of timing network CT1 with failing or improper energization of its output leads 3 and/or 41; gates P8, P12 and P13 have the same significance with reference to timing network CT3, as do gates P9, P10 and P15 with reference to timing network CT2.

The three XOR gates P7, P11 and P14 monitoring the performance of timing network CT1 all work into a logic circuit LM11 whose construction may be the same as that of decision networks LM1 – LM3 (FIG. 8) and which therefore also operates on the majority principle, generating an alarm indication $z1$ if at least two of its input leads are energized. Analogously, a logic network LM22 receives the outputs of XOR gates P8, P12 and P13 checking the network CT2 while the remaining XOR gates P9, P10 and P15 work into a logic circuit LM33 keeping track of network CT3; thus, circuits LM22 and LM23 generate respective alarm indications $z2$ and $z3$ upon failure of the associated timing network.

It should be noted that the system according to our invention can detect only one malfunction at a time and is not designed to handle the statistically improbable case of simultaneous failure of two time-base units.

When the system is first taken into use, the counters in timing networks CT1 – CT3 will generally not be synchronized with one another. The first network energizing its internal leads 3 and 4 with synchronizing signals SY* and SY will then remain in this state until at least one other network emits the same pair of internal and outgoing synchronizing signals, thereby causing all three decision networks to trip the associated monoflops MN (FIG. 4) for a simultaneous zero-setting of the three counters CO.

Figure 7:
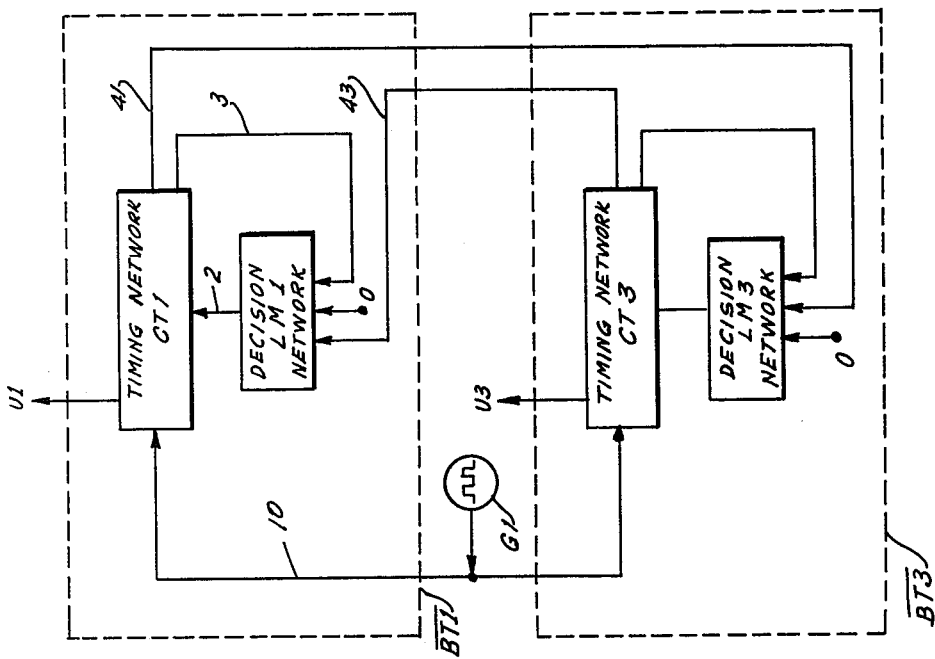
FIG. 7 is a block diagram similar to FIG. 1 but showing a simplified system with only two time-base units.

In FIG. 7 we have shown a simplified chronometric system according to our invention with only two time-base units $\overline{BT1}$ and $\overline{BT3}$ which differ from their counterparts in FIG. 1 by the omission of switchover networks DC1 and DC3, there being only one clock-pulse generator G1 feeding their timing networks CT1 and CT3 via lead 10. Decision networks LM1 and LM3 have here only two active inputs, i.e. one connected to internal lead 3 and the other tied to incoming lead 41 or 43; the third input is permanently grounded (logical value "0") so that output lead 2 will be energized only if synchronizing signals appear concurrently on the two other inputs. In this simplified system, failure of either network CT1 or CT3 cuts off the operation of both time-base units inasmuch as their counters CP will not be reset to restart the counting cycle.

Since the system of FIG. 7 can be readily expanded by the addition of a further time-base unit BT2 to operate in the more sophisticated manner discussed above, it will have particular utility in an initial phase of operation of a newly established telecommunication station some of whose components have not yet been installed. If only a single time-base unit TB1 is available, the two unused inputs of its decision network LM1 are advantageously connected to ground (logical "0") and high voltage (logical "1"), respectively, whereby the synchronizing signal SY* on lead 3 is automatically duplicated on the lead 2 for a periodic resetting of counter CP in network CT1.

We claim:

1. A chronometric system for generating separate but synchronized trains of timing signals, comprising:
   at least three substantially identical time-base units each including a timing network and an associated decision network; and
   a source of clock pulses common to said time-base units;
   each timing network having a stepping input connected to said source, a resetting input connected to said associated decision network, a main output for the emission of timing signals at a rate harmonically related to the cadence of said clock pulses, and a plurality of ancillary outputs for the concurrent transmission of synchronizing signals to the decision networks of all time-base units a predetermined number of clock-pulse cycles after reception of a coincidence signal from the associated decision network, each decision network including logical circuitry with input connections to respective ancillary outputs of all timing networks to generate said coincidence signal in response to concurrent synchronizing signals from at least a majority of said time-base units.

2. A system as defined in claim 1 wherein said source includes a master oscillator and a standby oscillator of identical operating frequencies, further comprising switchover means replacing an output lead of said master oscillator, normally connected to said timing network, with an output lead of said standby oscillator, normally disconnected from said timing network, in response to absence of clock pulses from said normally connected output lead.

3. A system as defined in claim 2 wherein said switchover means comprises a delay line tied to said normally connected output lead and provided with several terminals, separated by line sections introducing phase differences equal to integral fractions of a clock-pulse cycle, and a set of logic gates with input connections to combinations of said terminals for energization during overlapping periods of said cycle.

4. A system as defined in claim 2, further comprising checking means connected to said standby oscillator for testing its performance in the disconnected state of said output lead thereof.

5. A system as defined in claim 4 wherein said switchover means and said checking means comprise a plurality of logic networks individual to said time-base units and tied to respective branches of said output leads.

6. A system as defined in claim 1 wherein each timing network includes a primary pulse counter resettable by said coincidence signal and a secondary pulse counter resettable by a delayed signal from said primary pulse counter, said secondary pulse counter generating a synchronizing signal for the decision network of a different time-base unit ahead of the transmission of a synchronizing signal to the associated decision network with a time interval compensating for differences in transit time to said decision networks.

7. A system as defined in claim 6 wherein said ancillary outputs are branches of a common output of said secondary pulse counter, further comprising a shift register connected to said stepping input and inserted between one of said branches of said common output and said associated decision network for introducing said time interval.

8. A system as defined in claim 6 wherein each timing network further includes a monostable multivibrator inserted between said resetting input and a zeroizing input of said primary counter.

9. A system as defined in claim 1, further comprising monitoring means connected to all decision networks for generating an error signal in response to a concurrence of synchronizing signals from less than all said time-base units, said monitoring means including alarm-indicating means responsive to said error signal.

10. A system as defined in claim 9 wherein the number $n$ of said time-base units is greater than two, said alarm-indicating means including $n$ signal-generating networks with $n$ inputs each and logical gate means connecting said $n$ inputs of each signal-generating network to the outputs and to respective inputs of all decision networks whereby each signal-generating network receives error signals only upon a malfunction of a respective time-base unit, each signal-generating network producing an alarm signal only in response to a concurrence of error signals on at least a majority of its $n$ inputs.

11. A chronometric system for generating separate but synchronized trains of timing signals, comprising:
   a plurality of substantially identical time-base units each including a timing network and an associated decision network;
   a source of clock pulses common to said time-base units, said source including a master oscillator and a standby oscillator of identical operating frequencies; and
   switchover means replacing an output lead of said master oscillator, normally connected to said timing network, with an output lead of said standby oscillator, normally disconnected from said timing network, in response to absence of clock pulses from said normally connected output lead;
   each timing network having a stepping input connected to said source, a resetting input connected to said associated decision network, a main output for the emission of timing signals at a rate harmonically related to the cadence of said clock pulses, and a plurality of ancillary outputs for the concurrent transmission of synchronizing signals to the decision networks of all time-base units a predetermined number of clock-pulse cycles after reception of a coincidence signal from the associated decision network in response to concurrent synchronizing signals from at least a majority of said time-base units.

12. A system as defined in claim 11, further comprising checking means connected to said standby oscillator for testing its performance in the disconnected state of said output lead thereof, said switchover means and said checking means including a plurality of logic networks individual to said time-base units and tied to respective branches of said output leads.

13. A chronometric system for generating separate but synchronized trains of timing signals, comprising:
   a plurality of substantially identical time-base units each including a timing network and an associated decision network; and
   a source of clock pulses common to said time-base units;
   each timing network having a stepping input connected to said source, a resetting input connected to said associated decision network, a main output for the emission of timing signals at a rate harmonically related to the cadence of said clock pulses, a plurality of ancillary outputs for the concurrent transmission of synchronizing signals to the decision networks of all time-base units a predetermined number of clock-pulse cycles after reception of a coincidence signal from the associated decision network in response to concurrent synchronizing signals from at least a majority of said time-base units, a primary pulse counter resettable by said coincidence signal, and a secondary pulse counter resettable by a delayed signal from said primary pulse counter, said secondary pulse counter generating a synchronizing signal for the decision network of a different time-base unit ahead of the transmission of a synchronizing signal to the associated decision network with a time interval compensating for differences in transit time to said decision networks.

14. A system as defined in claim 13 wherein said ancillary outputs are branches of a common output of said secondary pulse counter, further comprising a shift register connected to said stepping input and inserted between one of said branches of said common output and said associated decision network for introducing said time interval.

15. A system as defined in claim 13 wherein each timing network further includes a monostable multivibrator inserted between said resetting input and a zeroizing input of said primary counter.

16. A chronometric system for generating separate but synchronized trains of timing signals, comprising:
   a number $n > 2$ of substantially identical time-base units each including a timing network and an associated decision network;
   a source of clock pulses common to said time-base units, each timing network having a stepping input connected to said source, a resetting input connected to said associated decision network, a main output for the emission of timing signals at a rate harmonically related to the cadence of said clock pulses, and a plurality of ancillary outputs for the concurrent transmission of synchronizing signals to the decision networks of all time-base units a predetermined number of clock-pulse cycles after reception of a coincidence signal from the associated decision network in response to concurrent synchronizing signals from at least a majority of said time-base units; and
   monitoring means connected to all decision networks for generating an error signal in response to a concurrence of synchronizing signals from less than all said time-base units, said monitorin means including $n$ signal-generating networks with $n$ inputs each and logical gate means connecting said $n$ inputs of each signal-generating network to the outputs and to respective inputs of all decision networks whereby each signal-generating network receives error signals only upon a malfunction of a respective time-base unit, each signal-generating network producing an alarm signal only in response to a concurrence of error signals on at least a majority of its $n$ inputs.

* * * * *